Figure 1:
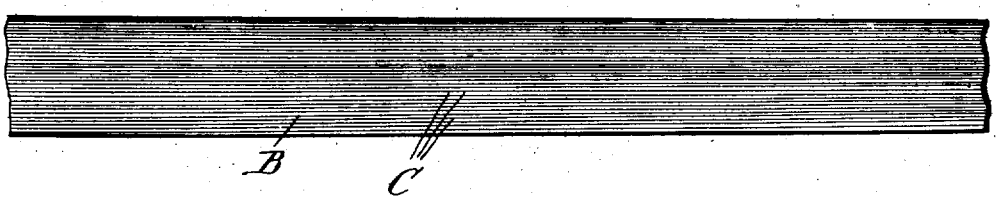

No. 11,677. Reissued July 5, 1898.

J. F. PALMER.

PNEUMATIC TIRE.

(Application filed May 13, 1898.)

Witnesses:

Chas. E. Gaylord,

Geo. S. Mills

Inventor:

John F. Palmer,

By Dyer, Duell & Duell

Attys.

UNITED STATES PATENT OFFICE.

JOHN F. PALMER, OF RIVERSIDE, ILLINOIS, ASSIGNOR TO THE PALMER PNEUMATIC TIRE COMPANY, OF CHICAGO, ILLINOIS.

PNEUMATIC TIRE.

SPECIFICATION forming part of Reissued Letters Patent No. 11,677, dated July 5, 1898.

Original No. 489,714, dated January 10, 1893. Application for reissue filed May 13, 1898. Serial No. 680,640.

*To all whom it may concern:*

Be it known that I, JOHN F. PALMER, a citizen of the United States, residing at Riverside, in the county of Cook and State of Illinois, have invented a new and useful Improvement in Pneumatic Tires, of which the following is a specification.

My invention relates to an improvement in the manufacture of pneumatic tires for bicycles and other vehicles, and more particularly to improvements in the structure of the tire and in the method of vulcanizing it and apparatus therefor.

In the manufacture of rubber tubing it has been the usual practice to form the same in one of two ways—either by making a flat strip of rubber and lapping the edges into the form of a tube or to form the tube upon a straight mandrel or core, subsequently removing the core therefrom. In both cases of course the tube is formed of the raw material, and vulcanization is then resorted to to form the product into a continuous unseamed length. For vulcanizing it has been the usual process, more particularly where the tube or tire is to be made in the form of an annulus, to inclose the tube within a hollow die having the intended shape of the finished product. Air, gas, or the like dry highly-expansive fluid is then forced into or generated in the interior of the rubber tube and held therein while the product remains in the vulcanizing-chamber, the expansion of the fluid serving to exert the necessary pressure, which, coupled with the heat of the furnace, produces perfect vulcanization of the product. Where a straight tubing is employed, it has been the practice to introduce an internal core and to wrap the rubber with canvas or the like, and it has been suggested that flexible foil may be employed for this purpose, the steam-pressure within the vulcanizing-chamber exerted from the outside of the rubber serving the purpose of the internal pressure in the previous method referred to.

In the production of annular tubing the method which involves the employment of an annular internal mandrel or core is not practicable, while, on the other hand, the production of an annular tube by a method which involves the producing of a straight tube is equally undesirable for obvious reasons. A great objection to the method suggested, which involves the introduction of air, gas, or other fluid into the interior of the tube to force it by internal pressure against the surrounding mandrel, is that the gas or other fluid enters the rubber and forms blow-holes, pockets, and the like, or is generated within the rubber by the expansion of foreign fluids held in the body of the raw material, or in the meshes of the canvas, when present, which results in pin-holes in places, sometimes extending even entirely through the rubber. For use as a pneumatic tube such a product is of little value.

For vulcanizing the pneumatic tire I employ a mandrel having the shape of an annulus and given an irregular circumferential cross-sectional area—that is to say, the periphery of the annulus thus produced is cut away to afford a rest for a collapsed soft-rubber tube. The rubber tube, having been made in an ordinary rubber-press and supplied in the course of formation with the proper ingredients for vulcanization, is powdered inside with soapstone-flour or the like substance, which will prevent the cohesion of the rubber surfaces. The ends are then joined, and the tube is thereupon collapsed by withdrawing the air from within the same. When in this collapsed condition, it is placed upon the periphery of the annular mandrel, the reduced portion of which is of such a dimension that when the tube is applied its convex surface will form approximately a portion of a circle in cross-section, the remainder of which is afforded by the inner or larger part of the mandrel. Thereupon the mandrel carrying the collapsed tube has wound about it a substantially non-stretching fabric, or, if preferred, perhaps tin-foil or other suitable substance. When thus wound, the mandrel is placed in the vulcanizing-chamber and subjected to the usual action, the steam or other pressure therein being exerted as to the entire tubing against the mandrel, while the introduced soapstone prevents the opposite faces of the tube from adhering together. When the vulcanization is complete and the tube is removed from the mandrel, the introduction of air will cause it to expand to a circular form in cross-section substantially without creases or indentations, or if they exist the creasing or crimping will be so slight as not to be objectionable.

The collapsible tube, which on completion is to constitute a pneumatic tire, has embedded in its wall threads which are kept out of contact with each other by interposed rubber and are arranged in layers at an angle to each other in such a manner that each layer of threads is presented spirally to the tube. This relative arrangement of the threads, two or more layers of which constitute the restraining fabric, serves to control the amount of stretching possible in either direction and substantially to prevent stretching in one direction when stretched to the limit in the other. The most economical and satisfactory method of producing such a reinforcing fabric is to employ strips of rubber having longitudinally embedded therein parallel fibrous threads, each strip being of suitable width and wound in a continuous spiral about the tube, the edges being joined and the joint being made more perfect by the eventual vulcanization. Instead of winding such a strip spirally it will be obvious that the threads may be embedded therein at an angle to the longitudinal and the strip then wrapped about the tube in such a manner that the meeting edges will be on the inner or seating side of the tube, where they may overlap or be otherwise joined. Ordinarily two such strips will constitute the tube. In all the forms here suggested the essential characteristic of my invention is obtained—namely, that the reinforcing-envelop, which is essential to prevent undue expansion of the rubber tube, is composed of strain-resisting threads out of frictional contact with each other by reason of the interposed rubber and arranged in oppositely-inclined spirals forming superposed layers.

To make the strip, the employment of which is here suggested, I proceed as follows: While calendering the rubber in the usual calendering-rolls, threads are fed to the sheet in the direction of its movement through the calendering-machine, these threads being close together, but, in the main at least, out of contact with each other and becoming embedded in the soft rubber as the sheet is formed. When the sheet is vulcanized, these threads become securely embodied therein and substantially prevent longitudinal stretching of the sheet, although lateral stretching is still possible. This sheet is then cut into strips longitudinally of the threads therein, or, in other words, the strips are so cut that each will have embedded in it threads extending longitudinally thereof. When such a strip is wound spirally about a mandrel or tubing, it is quite apparent that as it cannot stretch in one direction and there is no occasion to stretch it at right angles to the longitudinal thread a longitudinal strain or a transverse strain will result in the stretching to a small extent in either direction only. When another such strip is wound upon the mandrel or tube in the opposite direction to the first, it is found that either longitudinal or transverse stretching of the envelop to a limited and easily-controlled extent is possible; but if the strip be stretched to its limit longitudinally transverse stretching is entirely prevented, and, on the other hand, if the transverse stretching be performed to the limit permissible then longitudinal stretching becomes practically impossible. It will be understood, of course, that the amount of stretching which results from the inherent elasticity of the fiber is not taken into account. The effect referred to is produced by the fact that when a certain amount of longitudinal stretching has occurred the threads formerly crossing each other transversely are brought more nearly to a common straight line, presenting the longitudinal fiber to the stretching action. If longitudinal stretching of the fabric is to be entirely prevented, this may be accomplished by winding a further number of strips (one or more) at a more acute angle over that already applied.

In connection with a pneumatic tire for bicycles made of rubber tubing and which requires to be externally reinforced with a fabric composed wholly or in part of linen or the like the laterally non-extensible strip produced as described has many important advantages. It is found to afford a substantially perfect reinforcement equal in strength and in all valuable characteristics to the canvas ordinarily employed, and by reason of the possibility of perfect application and the readiness with which the edges may be cemented together it has many decided advantages which cannot be obtained with canvas. Moreover, the limitation placed upon the longitudinal or transverse stretching and the tendency of the threads when separated as the effect of stretching the fabric to return to their original relation to each other by reason of the resiliency of the rubber gives to the tread of the wheel a resiliency which is not to be obtained with canvas or with thread alone, and by reason of the fact that the threads are out of contact with each other and are not subjected to any frictional action upon each other breakage due to this cause is prevented.

Figure 2:
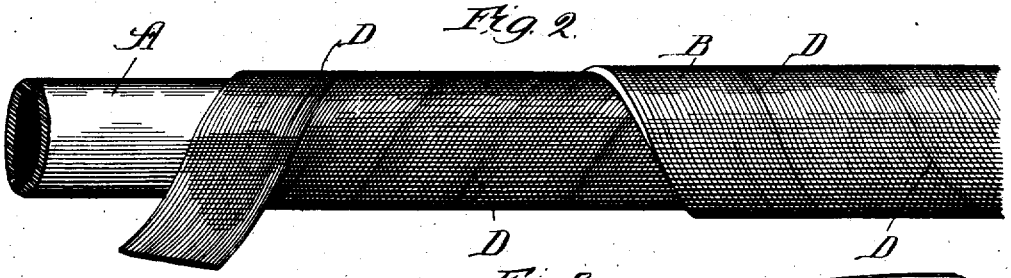

In the drawings, Figure 1 is a plan view of a strip of rubber having embedded therein longitudinal parallel threads in accordance with my invention. Fig. 2 is a perspective view of a section of rubber tube wound spirally with superimposed strips of rubber carrying longitudinal parallel threads, and Fig. 3 is a perspective view of a mandrel to which is applied a collapsed soft-rubber endless tubing preparatory to vulcanization.

A represents a tube made of rubber, and B a rubber strip having embedded therein longitudinal parallel fibrous threads C, preferably of linen or similar material of a character to be substantially non-stretching. In applying two such strips wound in opposite directions spirally upon the tube A it is preferred to wind them as illustrated in Fig. 2 and join the edges by cement or otherwise, as indicated at D in Fig. 2. It will be observed that lateral or transverse stretching of the envelop of the tube is prevented by the substantially straight direction of the strain upon the fibrous thread, while longitudinal stretching is still permitted.

Figure 3:
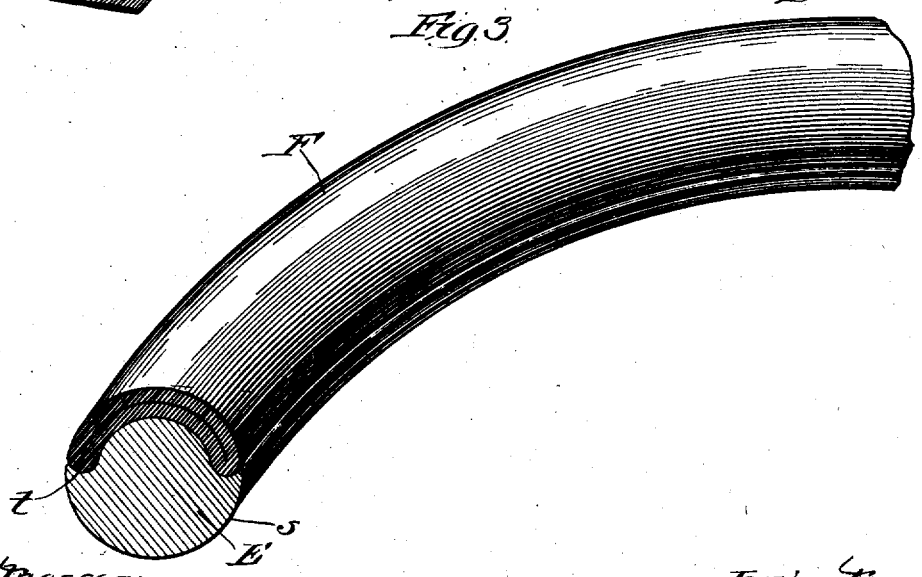

In Fig. 3 is illustrated the mode of applying the tube to the mandrel for purposes of vulcanization. E is the annular mandrel, usually made of wood or iron, having the peripheral surface cut away on the double-curved line *t*, the depth of the cutting being equal to the thickness in transverse section of the collapsed soft-rubber tube F, whereby the outer surface of the tube F forms, with the larger part *s* of the mandrel, approximately a circle. It will be understood, however, that the exact formation of a circle is not essential, although preferred, and that satisfactory results can be obtained by having the reduced or recessed surface of the mandrel on the inner instead of on the outer peripheral side, in which case the collapsing of the tube is performed on the opposite curvature to that shown.

I do not herein lay specific claim to the fabric or the method of producing the same in other forms than such as are necessary for its use in connection with tubing as hereinbefore described; but in another pending application, Serial No. 452,339, filed November 17, 1892, I have applied for a patent for the fabric generally and the method of producing the same.

What I claim as new, and desire to secure by Letters Patent, is—

1. As a new article of manufacture, a pneumatic tire comprising a vulcanized annular rubber tube having incorporated therewith layers of spiral threads of relatively non-stretching character, and substantially out of contact with each other, the spirals of the successive layers being oppositely disposed whereby they cross each other, substantially as described.

2. As a new article of manufacture, an annular rubber tube for pneumatic tires having spirally wound thereon and embedded and held therein by vulcanization, layers of fibrous threads of a substantially non-stretching character, and substantially parallel with but out of contact with each other, the threads of the successive layers crossing each other, and being maintained out of frictional contact, substantially as described.

3. As a new article of manufacture, a pneumatic tire comprising two or more strips of rubber, or the like, each having embedded therein flexible threads substantially parallel with each other and each wound spirally about the tubing, one strip being wound in the direction opposite to the other, substantially as described.

4. As a new article of manufacture, a pneumatic tire comprising two or more strips of rubber, or the like, having embedded therein, substantially parallel fibrous threads extending longitudinally of the strip, said strips being wound spirally about the tube with their edges joined to form a continuous tubing, and one strip being wound in an opposite direction to the other, substantially as described.

5. As a new article of manufacture, a pneumatic tube for bicycles, and the like, comprising an endless annular tube of rubber having an envelop formed of two or more spirally-wound strips of rubber, or the like, having embedded therein substantially parallel fibrous threads, one of said strips being wound in the direction opposite to that of the other, substantially as described.

6. The method of forming vulcanized endless tubing, which consists in forming the soft rubber before vulcanizing into a collapsed tube having introduced therein a cohesion-preventing substance, such as soapstone, applying the same thus collapsed to a mandrel having a surface adapted to receive it, winding the mandrel carrying the rubber with a flexible envelop, and thereupon vulcanizing, substantially as described.

7. The method of producing vulcanized endless rubber tubing, which consists in forming the soft rubber supplied with a vulcanizing agent into an endless collapsed tube having its adjacent interior faces prevented from adhering to each other, applying the collapsed tube to the periphery of a mandrel, said periphery being of the proper configuration to receive it, winding spirally about the mandrel carrying the rubber, a strip of vulcanized rubber having fibrous threads embedded therein longitudinally and substantially parallel, vulcanizing the product and thereupon removing the envelop, substantially as described.

8. A mandrel for use in producing vulcanized endless rubber tubing, comprising an annular body having its periphery reduced to afford a seat for the collapsed unvulcanized tubing, substantially as described.

JOHN F. PALMER.

In presence of—
M. J. FROST,
DAN. W. LEE.